US00RE48001E

(19) United States
(12) Reissued Patent
Lundblade et al.

(10) Patent Number: US RE48,001 E
(45) Date of Reissued Patent: *May 19, 2020

(54) SAFE APPLICATION DISTRIBUTION AND EXECUTION IN A WIRELESS ENVIRONMENT

(71) Applicant: QUALCOMM Incorporated, San Diego, CA (US)

(72) Inventors: Laurence Lundblade, San Diego, CA (US); Marc S. Phillips, San Diego, CA (US); Brian Minear, San Diego, CA (US); Yan Zhuang, San Diego, CA (US); Anand Krishnan, San Diego, CA (US); Stephen A. Sprigg, Poway, CA (US); Mazen Chmaytelli, San Diego, CA (US); Mitchell Oliver, San Diego, CA (US); Gerald Horel, Brentwood Bay (CA); Karen Crossland, San Diego, CA (US)

(73) Assignee: QUALCOMM Incorporated, San Diego, CA (US)

( * ) Notice: This patent is subject to a terminal disclaimer.

(21) Appl. No.: 14/945,210

(22) Filed: Nov. 18, 2015

Related U.S. Patent Documents

Reissue of:
(64) Patent No.: 8,588,766
Issued: Nov. 19, 2013
Appl. No.: 13/368,056
Filed: Feb. 7, 2012

U.S. Applications:
(63) Continuation of application No. 12/728,904, filed on Mar. 22, 2010, now Pat. No. 8,112,076, which is a
(Continued)

(51) Int. Cl.
*G06F 21/51* (2013.01)
*H04W 4/60* (2018.01)
(Continued)

(52) U.S. Cl.
CPC ..... *G06F 21/51* (2013.01); *G06F 8/61* (2013.01); *H04W 4/60* (2018.02);
(Continued)

(58) Field of Classification Search
CPC ... H04W 12/0023; H04W 4/60; H04W 12/10; G06F 21/51; G06F 8/61; H04L 63/0823
See application file for complete search history.

(56) References Cited

U.S. PATENT DOCUMENTS 4,919,545 A 4/1990 Yu
5,276,876 A 1/1994 Coleman et al.
(Continued)

FOREIGN PATENT DOCUMENTS

EP 0570123 11/1993
EP 0875815 11/1998
(Continued)

OTHER PUBLICATIONS

Covingo, A software platform and process for designing, deploying and managing mobile applications, including a table of contents, text pp. 1-87, and 67 pages of drawings . This NPL is the priority submission found in U.S. Appl. No. 60/263,574, filed Jan. 22, 2001.*

(Continued)

*Primary Examiner* — Eric B. Kiss
(74) *Attorney, Agent, or Firm* — Michael Taveira

(57) ABSTRACT

The present invention provides safe and secure application distribution and execution by providing systems and methods that test an application to ensure that it satisfies predetermined criteria associated with the environment in which it will execute. Furthermore, by using rules and permission lists, application removal, and a modification detection technique, such as digital signatures, the present invention provides mechanisms to safely distribute and execute tested,
(Continued)

or untested, applications by determining whether the application has been modified, determining if it has permission to execute in a given wireless device environment, and removing the application should it be desirable to do so.

48 Claims, 7 Drawing Sheets

Related U.S. Application Data continuation of application No. 11/467,877, filed on Aug. 28, 2006, now Pat. No. 7,684,792, which is a continuation of application No. 09/872,418, filed on May 31, 2001, now Pat. No. 7,099,663.

(51) Int. Cl.

| | |
|---|---|
| ***H04W 12/00*** | (2009.01) |
| ***G06F 8/61*** | (2018.01) |
| ***H04L 29/06*** | (2006.01) |
| ***H04W 12/10*** | (2009.01) |

(52) U.S. Cl.

CPC ..... *H04W 12/0023* (2019.01); *H04L 63/0823* (2013.01); *H04W 12/10* (2013.01)

(56) References Cited

U.S. PATENT DOCUMENTS

| | | | |
|---|---|---|---|
| 5,297,193 | A | 3/1994 | Bouix et al. |
| 5,509,073 | A | 4/1996 | Monnin |
| 5,724,425 | A | 3/1998 | Chang et al. |
| 5,737,708 | A | 4/1998 | Grob et al. |
| 5,764,726 | A | 6/1998 | Selig et al. |
| 5,825,877 | A | 10/1998 | Dan et al. |
| 5,838,910 | A | 11/1998 | Domenikos et al. |
| 5,862,474 | A | 1/1999 | Kimball |
| 5,892,904 | A | 4/1999 | Atkinson et al. |
| 5,940,590 | A | 8/1999 | Lynne et al. |
| 5,953,654 | A | 9/1999 | Li |
| 5,987,134 | A | 11/1999 | Shin et al. |
| 5,987,306 | A | 11/1999 | Nilsen et al. |
| 6,026,293 | A | 2/2000 | Osborn |
| 6,052,600 | A | 4/2000 | Fette et al. |
| 6,061,346 | A | 5/2000 | Nordman |
| 6,125,447 | A | 9/2000 | Gong |
| 6,158,010 | A | 12/2000 | Moriconi et al. |
| 6,167,522 | A | 12/2000 | Lee et al. |
| 6,199,204 | B1 | 3/2001 | Donohue |
| 6,256,493 | B1 | 7/2001 | Dorenbosch et al. |
| 6,259,791 | B1 | 7/2001 | Moore |
| 6,263,434 | B1 | 7/2001 | Hanna et al. |
| 6,289,462 | B1 | 9/2001 | McNabb et al. |
| 6,334,056 | B1 | 12/2001 | Holmes et al. |
| 6,339,826 | B2 | 1/2002 | Hayes, Jr. et al. |
| 6,411,941 | B1 | 6/2002 | Mullor et al. |
| 6,421,781 | B1 | 7/2002 | Fox et al. |
| 6,463,534 | B1 | 10/2002 | Geiger et al. |
| 6,480,962 | B1 | 11/2002 | Touboul |
| 6,493,870 | B1 | 12/2002 | Madany et al. |
| 6,496,979 | B1 | 12/2002 | Chen et al. |
| 6,519,470 | B1 | 2/2003 | Rydbeck |
| 6,587,684 | B1 | 7/2003 | Hsu et al. |
| 6,609,199 | B1 | 8/2003 | DeTreville |
| 6,615,038 | B1 | 9/2003 | Moles et al. |
| 6,628,938 | B1 | 9/2003 | Rachabathuni et al. |
| 6,675,201 | B1 | 1/2004 | Parkkinen |
| 6,694,370 | B1 | 2/2004 | Bischof et al. |
| 6,728,536 | B1 | 4/2004 | Basilier et al. |
| 6,771,290 | B1 | 8/2004 | Hoyle |
| 6,775,536 | B1 | 8/2004 | Geiger et al. |
| 6,782,527 | B1 | 8/2004 | Kouznetsov et al. |
| 6,862,696 | B1 | 3/2005 | Voas et al. |
| 6,931,545 | B1 | 8/2005 | Ta et al. |
| 6,941,134 | B2 | 9/2005 | White |
| 6,981,281 | B1 | 12/2005 | Lamacchia et al. |
| 6,999,748 | B2 | 2/2006 | White |
| 7,051,366 | B1 | 5/2006 | Lamacchia et al. |
| 7,076,557 | B1 | 7/2006 | Lamacchia et al. |
| 7,096,004 | B2 | 8/2006 | Minear et al. |
| 7,099,663 | B2 | 8/2006 | Lundblade et al. |
| 7,131,143 | B1 | 10/2006 | Lamacchia et al. |
| 7,174,534 | B2 * | 2/2007 | Chong ..... G06F 8/20 370/352 |
| 7,213,247 | B1 | 5/2007 | Wilner et al. |
| 7,350,204 | B2 | 3/2008 | Lambert et al. |
| 7,379,731 | B2 | 5/2008 | Natsuno et al. |
| 7,536,172 | B2 | 5/2009 | Minear et al. |
| 7,684,792 | B2 | 3/2010 | Lundblade et al. |
| 7,735,120 | B2 | 6/2010 | Wallace et al. |
| 7,917,888 | B2 * | 3/2011 | Chong ..... G06F 8/20 717/102 |
| 8,112,076 | B2 | 2/2012 | Lundblade et al. |
| 8,185,942 | B2 | 5/2012 | Farrugia et al. |
| 8,588,766 | B2 | 11/2013 | Lundblade et al. |
| 8,701,172 | B2 | 4/2014 | Sanders et al. |
| 9,659,162 | B2 | 5/2017 | Andrus et al. |
| 9,877,193 | B2 | 1/2018 | Li et al. |
| 2002/0078380 | A1 * | 6/2002 | Lin ..... G06F 21/10 726/28 |
| 2002/0107809 | A1 | 8/2002 | Biddle et al. |
| 2002/0131404 | A1 * | 9/2002 | Mehta et al. ..... 370/352 |
| 2002/0138582 | A1 | 9/2002 | Chandra et al. |
| 2003/0032406 | A1 | 2/2003 | Minear et al. |
| 2004/0067773 | A1 | 4/2004 | Rachabathuni et al. |
| 2004/0162889 | A1 | 8/2004 | Morris et al. |

FOREIGN PATENT DOCUMENTS

| | | | |
|---|---|---|---|
| EP | 0967765 | A2 | 12/1999 |
| EP | 0967765 | A2 | 12/1999 |
| EP | 1016960 | A1 | 7/2000 |
| EP | 1016960 | A1 | 7/2000 |
| JP | 6103058 | | 4/1994 |
| JP | 2001028572 | A | 1/2001 |
| WO | 0050978 | A1 | 8/2000 |
| WO | WO-0050978 | A1 | 8/2000 |
| WO | WO-0056105 | A1 | 9/2000 |
| WO | 0072149 | A1 | 11/2000 |
| WO | WO-0072149 | A1 | 11/2000 |

OTHER PUBLICATIONS

European Search Report—EP09174958—Search Authority—Munich—dated Mar. 15, 2012.

International Search Report—PCT/US02/016485—International Search Authority—European Patent Office dated Dec. 16, 2003.

Co-pending U.S. Appl. No. 60/220,269, filed Jul. 24, 2000.

Jaeger T., et al., 'Flexible Control of Downloaded Executable Content, ACM Transactions on Information and System Security, May 1999, vol. 2, No. 2, pp. 177-228.

European Search Report—EP09174958—Search Authority—Munich—Mar. 15, 2012.

International Search Report—PCT/US02/016485—International Search Authority—European Patent Office Dec. 16, 2003.

Seki et al., "A Proposal of a New Distribution Scheme for Software Products", IPSF SIG Notes, Japan by Information Processing Society of Japan, Jul. 20, 1993, vol. 93, No. 64 (93-IS-45), pp. 19-28.

* cited by examiner

SAFE APPLICATION DISTRIBUTION AND EXECUTION IN A WIRELESS ENVIRONMENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a Continuation of U.S. patent application Ser. No. 12/728,904 filed Mar. 22, 2010, entitled Safe Application Distribution And Execution in A Wireless Environment, now U.S. Pat. No. 8,112,076, which is a Continuation of U.S. patent application Ser. No. 11/467,877 filed Aug. 28, 2006, entitled Safe Application Distribution And Execution in A Wireless Environment, now U.S. Pat. No. 7,684,792, which is a Continuation of U.S. patent application Ser. No. 09/872,418 filed May 31, 2001, entitled Safe Application Distribution And Execution in A Wireless Environment, now U.S. Pat. No. 7,099,663, each of which is incorporated herein by reference in their entirety.

FIELD OF THE INVENTION

The present invention relates to processing of applications for use in a wireless device, and more particularly, to increasing the security, safety and integrity of applications executed on a wireless device.

BACKGROUND

Wireless communication has experienced explosive growth in recent years. As consumers and businesses rely more on their wireless devices, such as mobile phones and personal digital assistants (PDAs), wireless service providers, i.e., carriers, strive to provide additional functionality on these wireless devices. This additional functionality would not only increase the demand for wireless devices but also increase the usage among current users. Increasing functionality, specifically by increasing the applications accessible by the wireless device, however, is costly and complicated thereby discouraging carriers from providing this functionality.

Furthermore, there is little to no assurance that an application, once placed on a wireless device, will execute properly. Currently, reliance on the application's ability to execute on a wireless device rest on the developer, the wireless device maker and/or the carrier. As more applications are developed and the number of applications on a wireless device increases, the wireless device environment becomes more dynamic. For example, a wireless device may choose to retrieve or execute a number of different applications from large pool of available applications at any given time. Thus, ensuring that any given application will be distributed to the wireless device and execute safely becomes much more difficult to control.

This is of particular concern because improper execution of an application may not only detrimentally affect the wireless device, but it may also be harmful to the carrier network and other network components, including other wireless devices. For example, one application, if not restricted, could take control of a wireless device's power control and cause interference among other wireless devices and decrease the overall capacity in the cell servicing the wireless device.

Currently, neither wireless device manufacturers nor carriers are equipped to support the testing and safe distribution of applications in a dynamic application distribution and execution environment. Thus, there is a concern that applications will be distributed and executed on wireless devices that may cause harm to the wireless device, carrier network, or other network components.

In addition, other safety issues arise as more applications are developed and the environment by which applications are transmitted to a wireless device becomes more dynamic. As the number of applications and the number of developers creating these applications increases, the desire to know the source of any given application, i.e., the developer, also increases. A carrier or a handset manufacturer will want to know, with some degree of reliability, that they can determine the source of an application should the application cause harm.

Consequently, what is needed in the art is a system and method for providing a more safe environment for the distribution and execution of applications on a wireless device.

SUMMARY OF THE INVENTION

Systems and methods consistent with the present invention overcome the shortcomings of existing systems by creating a safer environment for application distribution and execution that test applications with predetermined standards, provide traceability to the developer for nonrepudiation, check for unintended modifications to the application, allow the removal of the application from the wireless device, and/or use rules and permissions that define the environment on which an application may execute.

Certifying that an application meets predetermined standards provides the advantage of catching possible errors that could occur during execution ahead of time. This helps to prevent the detrimental effect of an application's execution.

Traceability provides the advantage of non-repudiation. If there is any problem with the application, it is beneficial to trace back to the source of the application, i.e., the developer, to correct the problem. In addition, having traceability discourages developers from creating applications that have harmful results, either whether intended or unintended.

Furthermore, the ability to determine if an application is modified prior to receiving it at the wireless device provides the advantage of increased safety by ensuring that the application received is the same one that was transmitted. As applications are distributed more freely in the wireless environment, the ability to determine if an application was modified increases the confidence that an application received by the wireless device was not modified, either accidentally or intentionally.

Providing a set of rules and permissions that define when applications may execute also increases the safety of an application distribution and execution system by preventing the unauthorized execution of an application on platforms, e.g., systems or environments in which it is not authorized.

The ability to remove applications from a wireless device also increases the safety of an application distribution system. If an application is installed on a handset, either by the manufacturer or through an application download, having a mechanism to remove the application because of unforeseen negative consequences increases the safety of an application distribution and execution system by removing harmful and undesirable code that could be detrimental.

Systems and methods consistent with the present invention may invoke one or more of the techniques disclosed herein. By invoking all of the techniques disclosed and referenced herein, however, systems and methods consistent with the present invention provide for high quality and safe distribution and execution of applications.

In one embodiment of the present invention, a method for distributing and processing an application, comprises the steps of receiving the application and identification information, certifying the application satisfies a predetermined criterion, assigning a permission to the application, transmitting the application, the permission and the identification information to the a device using a modification detection technique, determining whether the application was modified during transmission, storing a rule on the device, determining if the application may be process using the permission and the rule, and removing the application from the device.

In another embodiment of the present invention, a method for executing an application on a wireless device, comprises the steps of storing a rule to evaluate a permission, receiving information comprising the application, the permission and an identification using a modification detection technique, receiving a request to execute the application on the wireless device, evaluating the received information to determine if the received information was modified, in the event the received information was not modified, evaluating the permission associated with the application, and in the event the permission is granted, executing the application.

In yet another embodiment of the present invention, a method for executing an application on a wireless device comprises the steps of storing a rule to evaluate a permission, receiving information comprising the application, the permission and an identification using a modification detection technique, receiving a request to execute the application on the wireless device, evaluating the received information to determine if the received information was modified, in the event the received information was not modified, evaluating the permission associated with the application, and in the event the permission is granted, executing the application.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention. In the drawings.

DETAILED DESCRIPTION OF THE PREFERRED EMBODIMENT

Figure 1:
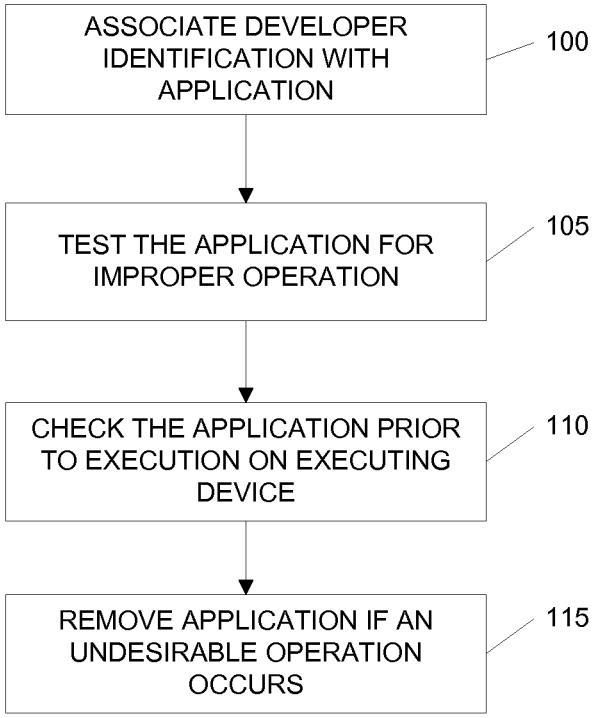
FIG. 1 is a flowchart depicting the high-level process of safe application distribution and execution in an exemplary embodiment of the present invention.

Reference will now be made in detail to the exemplary and preferred embodiments of the invention as illustrated in the accompanying drawings, in which like reference characters designate like or corresponding parts throughout the several drawings. The nature, objectives and advantages of the present invention will become more apparent to those skilled in the art after considering the following detailed description in connection with the accompanying drawings.

The present invention provides safe and secure application distribution and execution by providing systems and methods that test an application to ensure that it satisfies the predetermined criteria associated with the environment in which it will execute. Furthermore, by using rules and permission lists, application removal, and a modification detection technique, such as digital signatures, the present invention provides mechanisms to safely distribute and execute a tested, or untested, application by determining whether the application has been modified, determining if it has permission to execute in a given wireless device environment, and removing the application should it be desirable to do so.

It will be recognized to those skilled in the art that the forgoing describes an application file type being distributed and executed for simplicity of description. An "application" may also include files having executable content, such as: object code, scripts, java file, a bookmark file (or PQA files), WML scripts, byte code, and perl scripts. In addition, an "application" referred to herein, may also include files that are not executable in nature, such as documents that may need to be opened or other data files that need to be accessed.

FIG. 1 is a flowchart depicting the high level process of safe application distribution and execution in a manner consistent with an exemplary embodiment of the present invention. An embodiment of the present invention enables a developer identification to be associated with the application, performs testing on the application for the environment where the application is intended to execute, assigns permissions that can be used to dictate which devices or systems may execute the application, and provides for application removal should an application perform illegal or undesirable actions.

It is preferable that systems and methods employ all these techniques to increase the safe distribution and execution of an application. It will be recognized, however, that even employing one or more of these techniques will increase the safe distribution and execution of an application.

The high level process begins by associating the developer identification with an application (Step 100). This process may be performed by binding the developer identification with the application as it is distributed. Alternatively, the associated developer identification may be stored along with the corresponding application on a server in the system. It is also preferable that the developer identification information be stored and associated with the application information so that it cannot be easily modified.

The application is then tested for improper operation (Step 105). The application may be used in an environment where improper operation may not only affect the device on which the application is running, but also those other devices that are connected or networked with that device. It is preferable to test the application so that it does not make improper system calls or negatively affect the device or other connected devices during its operation. In one embodiment, this testing is performed by a certification process where the application is tested to determine if it meets predetermined criteria. It is preferable also, to have a certification process independent of the developer, to test the application. The independence of the certification process encourages more accurate and reliable testing.

Prior to executing the application, the application is checked to determine if it is "allowed" to execute on the device (Step 110). This check may be performed by the use of permissions and rules, described below, or by other permission mechanisms known to those skilled in the art. Furthermore, it is preferable that the application be checked prior to every attempt to execute the application. This persistent checking process increases the safety of executing the application. For example, it guards against an application having a Trojan horse that may have been inserted into that application on the executing device via another application.

An application that performs an improper or undesirable operation is then removed from the device (Step 115). This prevents the application from doing any further damage and also frees up the memory in the device for other uses. Alternatively, the application does not need to be removed from the application. Removing an application may refer to the disabling of the application and leaving the application on the device.

Figure 2:
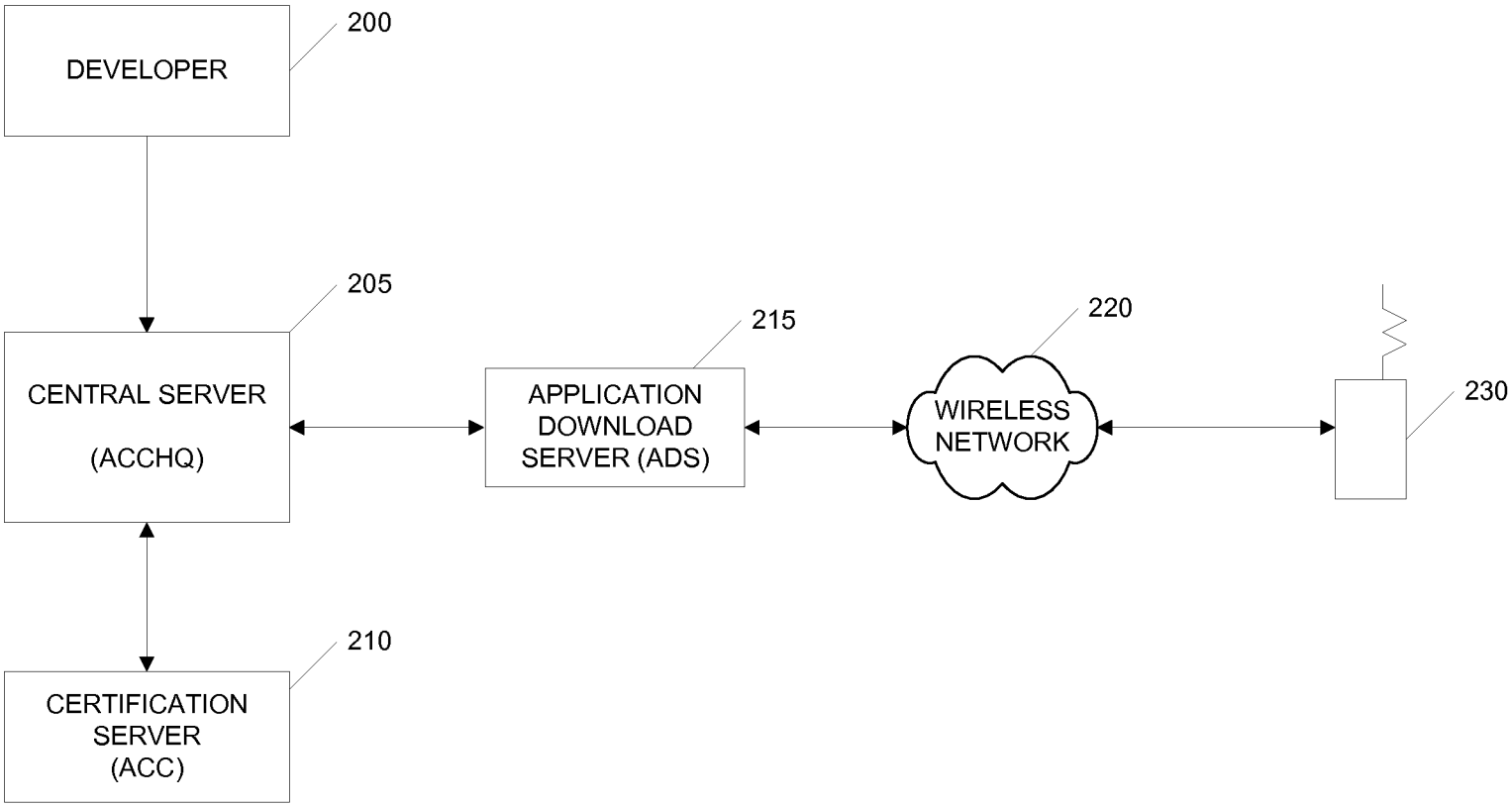
FIG. 2 is a block diagram depicting a system architecture in which an exemplary embodiment of the present invention may be practice.

FIG. 2 depicts a system architecture in which an exemplary embodiment of the present invention may be practiced. A developer 200 creates an application for use on the wireless device 230. As described above, it will be recognized by those skilled in the art that, while the foregoing description includes an application file type, other file types may be used. Furthermore, it will be recognized by those skilled in the art that the present invention may be used with other wireless or non-wireless devices and may employ wireless networks, non-wireless networks, or a combination thereof.

Typically, the developer 200 will have a set of development specifications for which to develop the application to execute on the wireless device 230. In one embodiment, the wireless device includes a software platform to assist the application's interface with the wireless device, such as the BREW™ software developed by QUALCOMM, Incorporated, headquartered in San Diego, Calif. The developer may create the application satisfying the software platform, or BREW™ software, specification standards, and conventions.

The developer 200 is connected to a central server 205, in one embodiment, so that it may electronically transmit the application to the central server 205. In one embodiment, the central server is an Application Control Center Headquarters (ACCHQ) server used in the distribution of applications to wireless devices. The developer 200 may digitally sign the application (discussed further below) to determine if the application was modified. It will be recognized that a physical connection to the central server is not necessary. For example the developer 200 may send, such as via first class mail, the application to the central server 205 stored on a CD-ROM.

In addition, the developer sends various source identification information to the central server 205. This source identification information may include any type of information that may be associated with the application that identifies the developer, such as a company name, tax identification of the company, or other identifying information.

The central server 205, either by itself or using a certification server 210, is used in the analysis and certification of applications. In one embodiment, an Application Control Center (ACC) may be used as a certification server. The certification server 210 may be used to analyze the application to determine whether the application satisfies predetermined certification criteria. This criteria may include whether the application satisfied the development specification for execution on a wireless device or platform. The certification criteria, however, can be any criteria that an application must satisfy prior to execution on a wireless device or platform. Such criteria may include verifying: (a) that the application functions as claimed by the developer, so that the application does not harm the wireless device's operation (e.g., it does not crash the phone); (b) that the application does not access data or memory that it should not (e.g., it doesn't access data or files owned by other applications, the operating system or platform software); and (c) that it does not negatively impact the wireless devices resources, such as detrimentally monopolizing the input and output of the wireless device.

The central server 205 may also assign a set of permissions in a list associated with the application. This permission list is determined by various factors, including an analysis of whether the application passed the certification process, what networks 220 the application is approved to execute on, and whether the wireless device supports the application. There may be many factors used to determine a permission list and is left to those skilled in the art when implementing the present invention.

The central server 205 receives the developer identification information and correlates it with the application created by the developer 200. Should any problems exist with the application, the central server will be able to identify the source of the application. In one embodiment, the developer information is passed to the wireless device 230 so that the correlation may be performed by the wireless device or other systems connected to the wireless device.

In one embodiment, the central server is also connected to an application download server (ADS) 215. The application download server 215 is used to interface with a wireless device via a wireless network 220 to download an application. The central server may also send the permissions list and developer identification associated with the application to the ADS where it can be stored until transmission to a wireless device. It is preferred that the application, permission list and the developer identification be digitally signed by the central server to increase security from modification.

It will be recognized by those skilled in the art that an ADS may be used to connect to multiple networks 220 for the distribution of applications, files and other information to the various wireless devices 230. Furthermore, wireless and non-wireless networks may be employed to transmit the application's permission list and developer identification to the wireless device.

In response to a request for an application, the ADS 215 will send the application, permission list, developer identification, and digital signature(s) to the wireless device 230 via the network 220. In one embodiment, the wireless device 230 will contain a key to check the digital signature in order to determine if the application, permission list and/or developer information is modified.

It is preferred, if digital signatures are employed in the present invention, that the central server use a secure key to create the digital signature and install a key on a wireless device to evaluate the digital signature. By using a secure key, the wireless device will have a higher degree of reliability that the digital signature was created by the central server and not an imposter.

Should the application cause any errors on the wireless device, or for any other desired reason, the wireless device may initiate the removal of the application. Furthermore, an application may be removed from the wireless device based on a request from the ADS or central server. This request from the server may be initiated for any desired reason. For example, the server may initiate the removal of applications from a wireless device because the application performed improperly on another device, a new version of the application is distributed, or even business reasons dictating that the application should be removed. This application removal process further protects the wireless device environment from repeated execution of corrupted and/or destructive applications.

Figure 3:
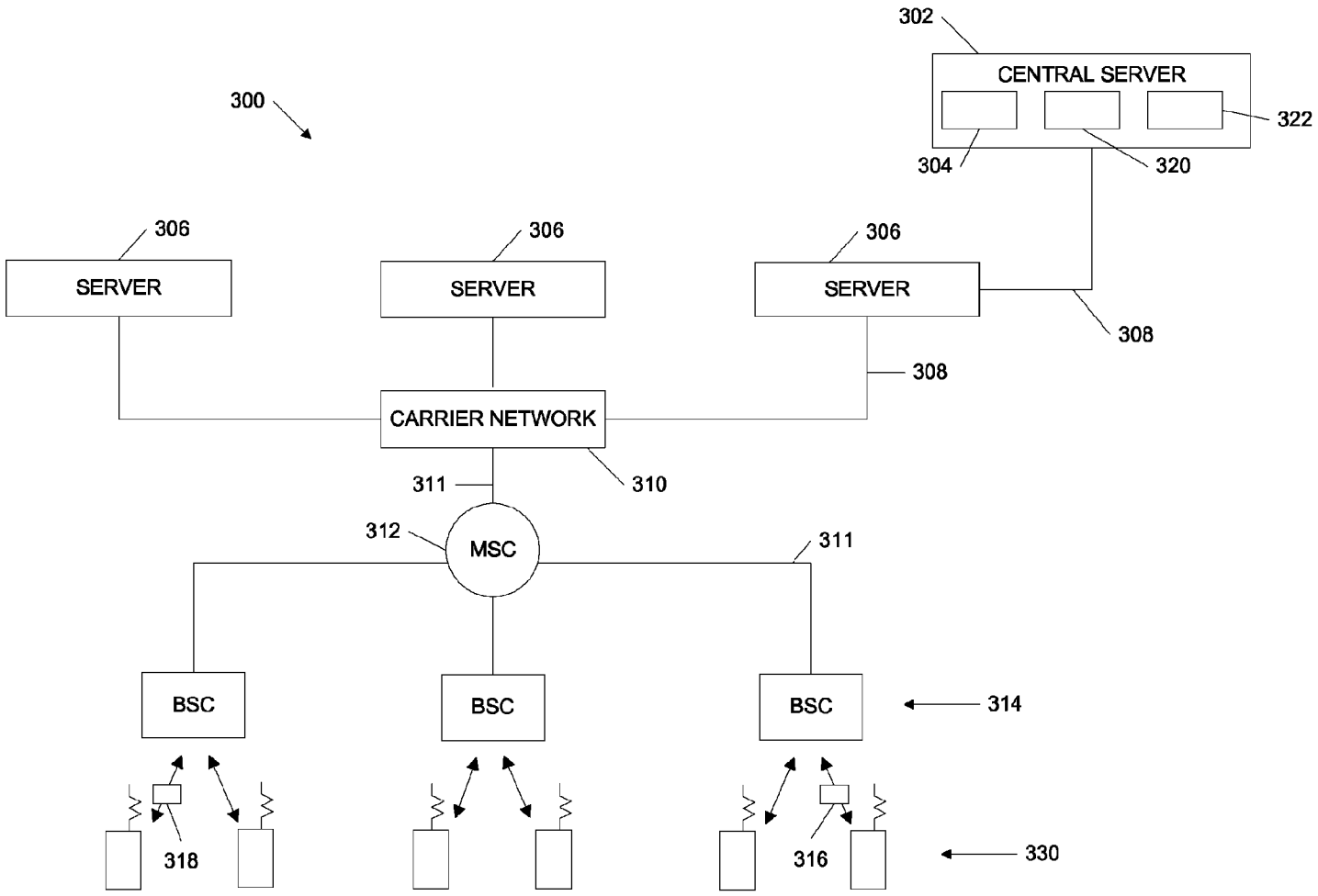
FIG. 3 is a block diagram depicting a wireless network architecture in which a safe application distribution processing system may be practiced in an exemplary embodiment of the present invention.

FIG. 3 depicts a wireless network architecture in which an application distribution system may be practiced in an exemplary embodiment of the present invention. A central server 302 is an entity that certifies, either by itself or in combination with a certification server, the application programs as compatible with a defined set of programming standards or conventions. As described earlier, these programming standards may be established so that the application will execute on a software platform, such as the BREW™ platform.

In one embodiment, the central server database 304 consists of a record of the identifications for each application program downloaded at any time onto each wireless device 330 in the network 300, an Electronic Service Number ("ESN") for the individual who downloaded the application program, and a Mobile Identification Number ("MIN") unique to the wireless device 330 carrying that application program. Alternatively, the central server database 304 contains records for each wireless device 330 in the network 300 of the wireless device model, wireless network carrier, the region where the wireless device 330 is used, and any other information useful to identify which wireless device 330 are carrying which application programs. In addition, the central server database may also store this developer identifying information associated with an application.

In one embodiment, the central server 302 may also include a remove command source 322. The remove command source 322 is the person(s) or entity(ies) that may make the decision to remove one or more targeted application programs. The remove command source 322 also is the entity that constructs a remove command 316 (discussed below) that is broadcast to identified wireless device 330 carrying the targeted application program(s). Alternatively, and without limitation, the remove command source 322 may be one or more persons or entities involved with the development and issuance of the targeted application program, persons or entities involved with the manufacturing of the wireless device 330, and/or persons or entities involved with the function of any part of the network 300.

The central server 302 communicates with one or more computer servers 306, e.g., an ADS, over a network 308, such as the Internet, preferably secured. The servers 306 also communicate with a carrier network 310 via a network 308. The carrier network 310 communicates with the MSC 312 by both the Internet and Plain Ordinary Telephone System (POTS) (collectively identified in FIG. 3 as 311). The Internet connection 311 between the carrier network 310 and the MSC 312 transfers data, and the POTS 311 transfers voice information. The MSC 312, in turn, is connected to multiple base stations ("BTS") 314. The MSC 312 is connected to the BTS by both the Internet 311 (for data transfer) and POTS 311 (for voice information). The BTS 314 sends messages wirelessly to the wireless devices 330 by short messaging service ("SMS"), or any other over-the-air method.

One example of a message sent by the BTS 314 in the present invention is a remove command 316. As further discussed herein, the wireless device 330, in response to receiving a remove command 316, responds by uninstalling a targeted application program stored on the wireless device 330. In one embodiment, the remove program may additionally or alternatively be programmed to disable the targeted application program or reprogram it to perform differently. The wireless device may also delete the application and any related information, such as a permission list.

The remove command 316 is constructed by the remove command source 322 (which may or may not be the same person(s) or entity(ies) that made the decision to initiate a remove of the targeted application program). The remove command 316 is sent by the remove command source 322 over the network 300 for broadcasting to the wireless devices 330.

By using the remove command as described in the above embodiment, the safety of application distribution and execution is increased by providing a mechanism to uninstall corrupted or undesirable applications. It will be recognized by those skilled in the art that, while the preceding described a remove command initiated by the central server, the wireless device may also initiate the removal or uninstallation of the application and its related information.

Similarly, the above network may be used to send the application, permission list and associated digital signatures from the central server to various servers 306 (e.g., ADS') through the MSC and BTS to the wireless devices 330.

Figure 4:
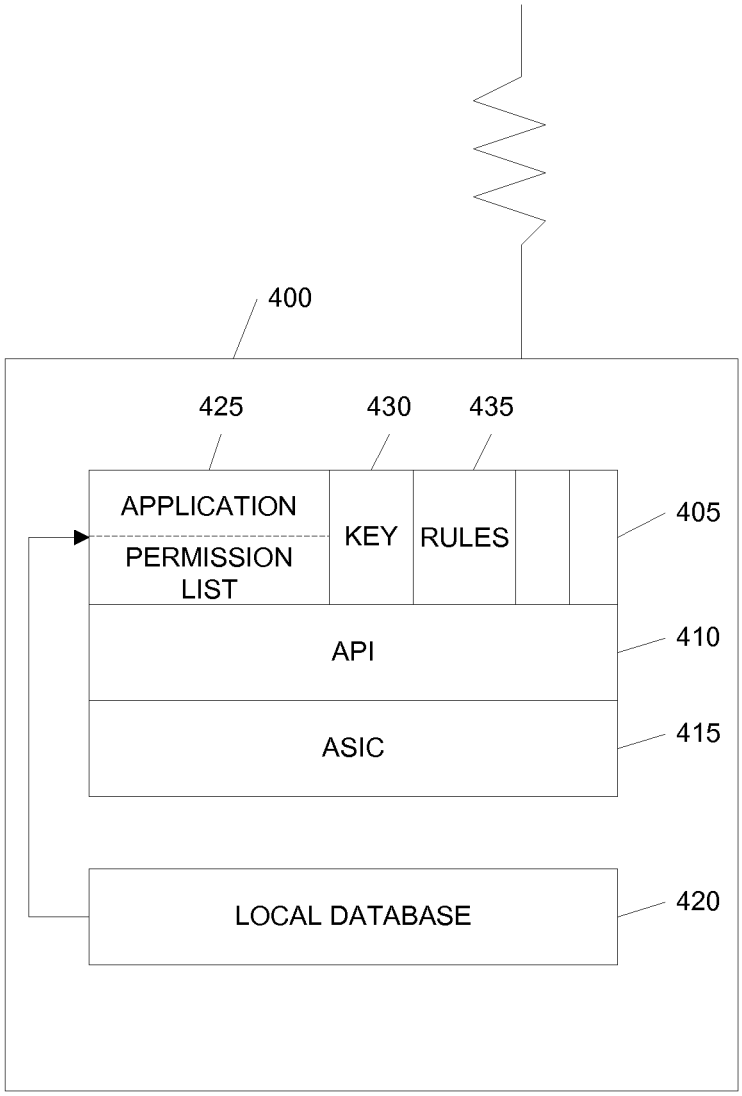
FIG. 4 is a block diagram depicting a wireless device and some internal components in an exemplary embodiment of the present invention.

FIG. 4 depicts a wireless device and some internal components in an exemplary embodiment of the present invention. While this embodiment is directed to a wireless device 400, it is used as an example without any intended limitation. The invention could alternatively be performed on any form of remote module capable of communicating through a network, including, without limitation, wireless and non-wireless devices, such as personal digital assistants ("PDAs"), wireless modems, PCMCIA cards, access terminals, personal computers, devices without a display or keypad, or any combination or sub-combination thereof. These examples of remote modules also may have a user interface, such as a keypad, visual display or sound display.

The wireless device 400 shown in FIG. 4 has an application-specific integrated circuit ("ASIC") 415 installed at the time the wireless device 400 is manufactured. The ASIC is a hardware component that is driven by software included in the ASIC. An application programming interface ("API") 410 is also installed in the wireless device 400 at the time of manufacture. In one embodiment, the API represents a BREW API or software platform. The API 410 is a software program configured to interact with the ASIC. The API 410 serves as an interface between the ASIC 415 hardware and application programs (discussed below) installed on the wireless device 400. Alternatively, the wireless device 400 may contain any other form of circuitry that would allow programs to be operated in a manner that is compatible with the hardware configuration of the wireless device 400. The wireless device 400 also has storage 405. The storage 405 consists of RAM and ROM, but, alternatively, could be any form of memory, such as EPROM, EEPROM or flash card inserts.

The storage area 405 of the wireless device may be used to store received applications and permission lists 425. In addition, the storage area 405 may be used to store one or more "keys" 405. These keys can be applied to a digital signature using a signature algorithm to determine whether the signed information was modified.

Rules 435 may also be installed on the wireless device 400. These rules may be used in conjunction with the permission list to determine if an application is allowed to execute. For example, a rule may state that an application is allowed to execute if a certification flag is set in the permission list (i.e., indicating the application passed certification). The permission list will have the certification flag set or not, depending on whether it passed certification. By applying the rule to the information contained in the permission list, permission to execute the application is either granted or denied.

The manufacturer (not shown) of the wireless device 400 may download application programs onto the storage 405 of the wireless device 400 at the time the wireless device 400 is manufactured. These application programs may be any program potentially useful or entertaining to the user of the wireless device, such as games, book, or any other type of data or software programs. The application programs also may be downloaded onto the wireless device 400 over the air after the wireless device is manufactured.

The remove program, when executed by the wireless device 400, uninstalls one or more targeted application programs from one of the applications stored on the wireless device 400. The targeted application program is an application program that needs to be uninstalled from the wireless device 400 for various reasons discussed below.

The wireless device 400 has a local database 420 installed by the manufacturer. The API of the wireless device is programmed to automatically update the local database 420 with a record of identifying information about each of the application programs stored on the wireless device 400. The local database 420 contains a record of the signature identifications unique to each application program stored on the wireless device 402. Additionally, the local database 420 may contain a record of the location of the application programs within the storage 405 on the wireless device 400 and any other information useful for keeping track of which application programs are downloaded on the wireless device 400, and where they are located.

Figure 5:
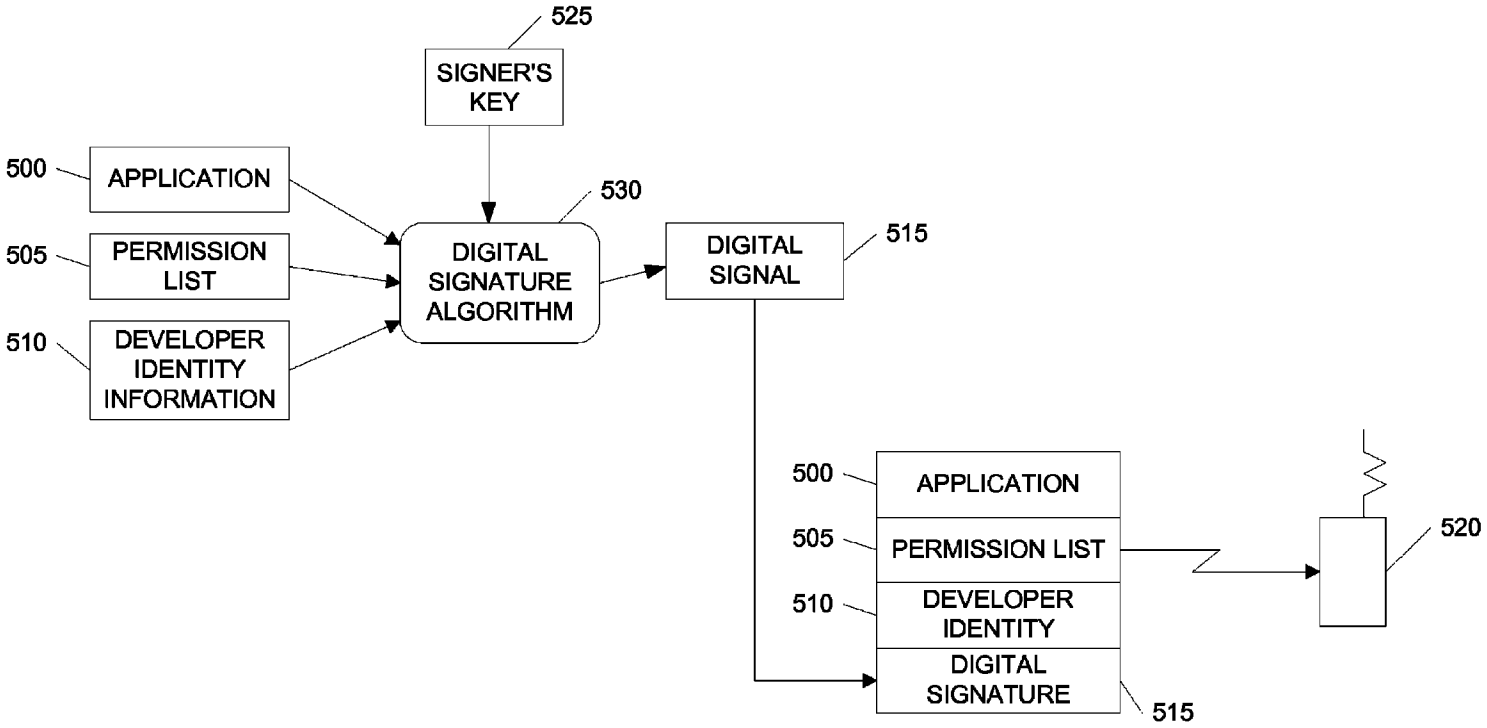
FIG. 5 is a block diagram depicting information used to create a digital signature and transmitted to a wireless device in an exemplary embodiment of the present invention.

FIG. 5 is a block diagram depicting information used to create a digital signature and transmitted to a wireless device in an exemplary embodiment of the present invention. As is known by those skilled in the art, digital signatures may be used to track whether a digital file has been modified. As described, digital signatures can be applied to any digital file, including documents, applications, databases, etc. In general, a digital signature is created by applying a key to a file using a signature algorithm. This digital signature is created using the information contained in the file. Typically, the digital signature is sent along with the file to a recipient. The recipient of the file and digital signature can then apply a key to the received file and digital signature to determine if the file has been modified during the transmission to the recipient.

Keys used to create and evaluate a digital signature can be used to determine the identity of the signer. For example, a key may be generated to create a digital signature by an entity and kept securely. This entity can distribute a corresponding key that can be used to evaluate the digital signature. If the key is kept securely and not compromised, the recipient evaluating the digital signature can determine not only whether the information was modified, but also the identity of the signer.

Alternatively, third-party entities can create keys for specific entities in a secure fashion. Therefore, a recipient having a key associated with a specific identity will be able to determine if that entity was the signer.

In one embodiment of the present invention, a digital signature 515 is generated by using the signer's key 525, e.g., a key of the central server (see FIG. 2), the application 500, the permission list 505 and the developer identity information 510 as input to a digital signature algorithm 530. The result is a digital signature 515 that is dependent on the information contained in the inputs.

After creating the digital signature 515, the application 500, permission list 505, developer identity information 510 and digital signature 515 are transmitted to the wireless device 520. The wireless device can then use the digital signature to determine if any of the application or related information (i.e., the permission list and developer identity information) was modified. In addition, using one of the techniques described above, such as a secure key, the wireless device may also have confidence in the identity of the signer who transmitted this information to the wireless device.

Figure 6:
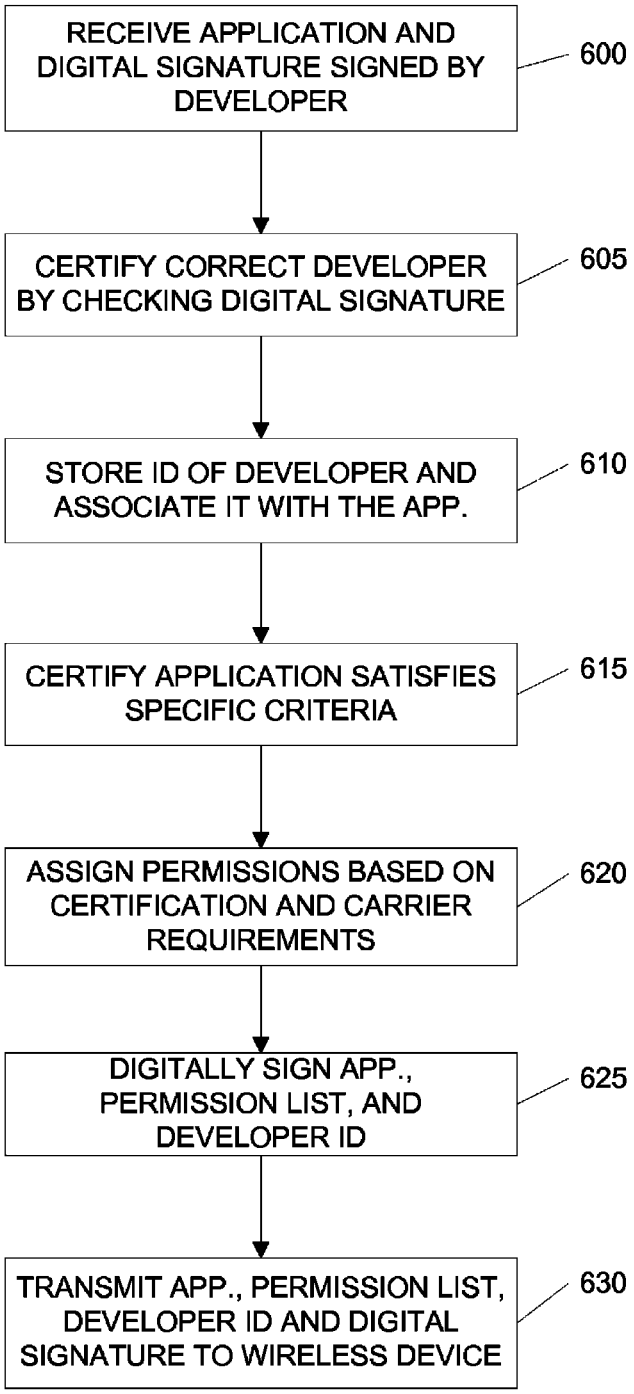
FIG. 6 is a flowchart depicting the steps used to by a server or severs in distributing an application in an exemplary embodiment of the present invention.

FIG. 6 is a flowchart depicting the steps used to by a server or servers in distributing an application in a manner consistent with an exemplary embodiment of the present invention. In this exemplary embodiment, the process begins by receiving an application and a digital signature (Step 600). The digital signature is information related to the application such that it can be determined if the application was modified prior to its reception. Furthermore, it is preferable that the key used to sign the digital signature be assigned by a third party in order validate that the entity or developer signing the application is the developer that received the assigned key.

After receiving the application and digital signature, the digital signature is evaluated to determine if the develop who sent the application is the same as the one who signed the application (Step 605). If a third party assigned the key to the developer to create the digital signature, then the third party may also assign the key to evaluate the digital signature to the receiving party, such as to the central server described with respect to FIG. 2.

The identification of the developer, or whichever entity signed and/or created the application, is then stored and associated with the application (Step 610). The storage may be in a table, database or in some other manner such that it can be later retrieved in the event the identity of the developer needs to be determined. In one embodiment, the storage of the developer's identification is stored in a wireless device and not in a server.

The received application is then certified to determine if it meets specified criteria (Step 615). In one embodiment, an application may be written to execute on a specific platform, such as the BREW™ platform developed by QUALCOMM, Incorporated, headquartered in San Diego, Calif. used in wireless devices. A specific platform, or device, may have specific requirements that an application must meet prior to having it executed on the device. For example, a platform or device may require that an application not access specific memory locations in the device so that the integrity of the device or other applications located in memory are not compromised. These criteria can be specified and the application can be tested to determine if these criteria are met. Preferably, these criteria are predetermined and provided to the developer to incorporate into the application's development.

After certification, the permissions associated with the application for a given environment are assigned (Step 620). Permission may be assigned based on many factors, depending on the environment in which the present invention is implemented. In one embodiment, the applications are intended for a wireless device. In this embodiment, assigning permissions may depend on the carrier network, a wireless device's requirements, results of certification testing, and developer, carrier or other testing environments, for example. Therefore, an example of a permission list is an indication that the application passed certification testing and that it may execute on a specific carrier's network.

The server then digitally signs the application, permission list, and developer identification (Step 625). In one embodiment, this signature is performed using a secure key so that the identity of the server can be determined by those receiving this digitally signed information. It is not required that the developer's signature that was received by the server also be signed or that the developer's signature be sent to the wireless device.

The application, permission list, developer identification and the signature created in step 625 is then transmitted to a wireless device (Step 630).

Figure 7:
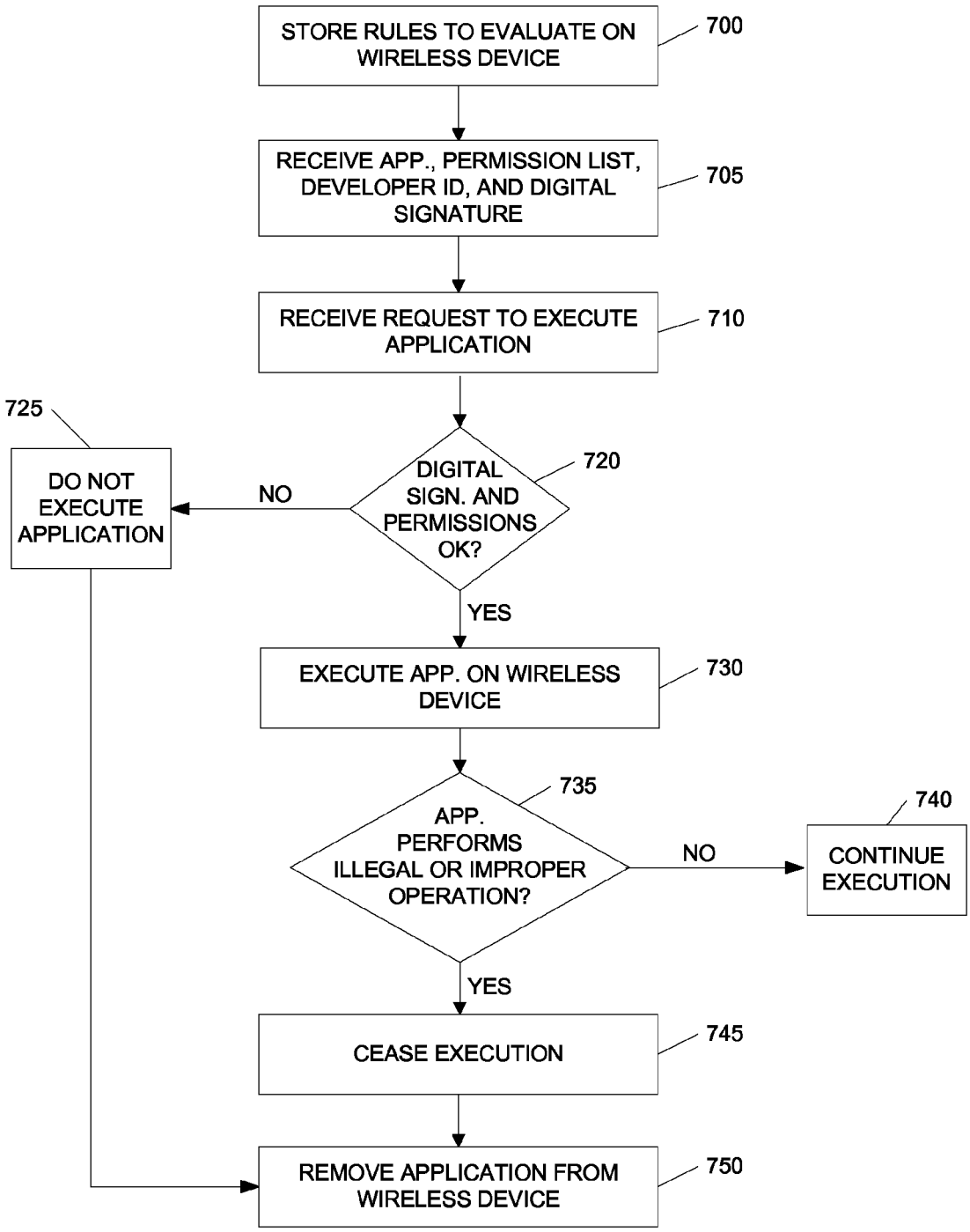
FIG. 7 is a flowchart depicting the steps used by a wireless device when executing an application in an exemplary embodiment of the present invention.

FIG. 7 is a flowchart depicting the steps used by a wireless device when executing an application in a manner consistent with an exemplary embodiment of the present invention. In this embodiment, the wireless device stores rules to evaluate permissions associated with an application (Step 700). It will be recognized by those skilled in the art that, while the present invention describes a rules/permissions paradigm, there are many paradigms that may be used to grant permission to an application for a specific device or platform and these are considered within the scope of the present invention.

The wireless device then receives the application, permission list, developer identification and digital signature (Step 705). In one embodiment, the wireless device may evaluate the received digital signature to determine the identity of the signer. The digital signature may also be used to determine if the application, permission list or developer identification was modified after having been signed.

The wireless device then receives a request to execute the application (Step 710). This request may come from the user of the wireless device wanting to execute a program. Alternatively, the request may be made by the wireless device itself or from some request transmitted to the wireless device, either through a network or direct connection to the wireless device.

After receiving the request, the wireless device evaluates the digital signature and the permission list associated with the application prior to its execution (Step 720). As described, the wireless device, in one embodiment, may use rules to evaluate the permissions list. If by evaluating the digital signature it is determined that the application, permission list or developer identification was not modified, then the wireless device evaluates the permission list using the stored rules. If there was no modification and the evaluation of the rules against the permission list indicates that the application is granted permission to execute in the wireless device, the processing proceeds to execute the application on the device (Step 730).

If the evaluation in Step 720 indicates that either the application, permission list or developer identification was modified after being signed, or that the application is denied permission to execute on the wireless device, then the application is not executed (Step 725). Processing proceeds to remove the application from the wireless device (Step 750). It is also preferred that the permission list and developer identification also be removed from the wireless device.

Following step 730, the application's execution is monitored to determine if it performs an illegal or improper operation (Step 735). The wireless device or the platform the wireless device is using may define certain operations to be illegal or improper. These operations may include those that access restricted areas of memory or memory locations used by other programs or files. In addition, these operations may involve harmful uses of the wireless device's resources such that they may not only affect the wireless device, but other devices on the network the wireless device is attached.

If such an illegal or improper operation is attempted, then the application's execution is stopped (Step 745) and removed from the wireless device (Step 750) along with, preferably, the developer identification and permission list. As stated above, alternatively, the remove process may involved the disabling of the application, thereby preventing its execution, and keeping the application on the wireless device.

If no illegal, improper, or undesirable operation is performed in step 735, then the application is allowed to continue execution (Step 740).

CONCLUSION

Using mechanisms to certify, detect modifications, determine source identity, assign permissions, and incorporate the ability to remove the application, systems and methods consistent with the present invention increase safe and secure application distribution and execution. Systems and methods may implement as few or all of these mechanisms. The more mechanisms implemented, the higher the degree of safety that is achieved.

In one embodiment, a developer sends an application to a server. The developer may sign the application to protect against unauthorized modification. A server checks the identity of the developer, and performs certification testing on the application. The server also assigns permissions to the application, creating a permission list. The application, permission list, developer identification are digitally signed by the server and sent to a wireless device along with the digital signature. A wireless device checks the digital signature for modification and the permission list against stored rules prior to executing the application. In one embodiment, these checks are performed prior to each attempt to execute the application on the wireless device. If the checks indicate the application has been modified or denied permission to execute, the application does not execute and is removed from the wireless device. Furthermore, if during execution, the application attempts an illegal or improper operation, the application is terminated and then removed from the wireless device.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but one embodiment of the present invention may be implemented as a combination of hardware and software or in hardware alone. The invention may be implemented with both object-oriented and non-object-oriented programming systems. Additionally, although aspects of the present invention are described as being stored in memory, those skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A method of operating a server, comprising:

receiving an application and a first identification information that identifies a source of the application;

determining that the application satisfies each criterion in a set of criteria, wherein each criterion is respectively associated with *safeguarding* a wireless device execution environment;

assigning, to the application based on the determination, a set of permissions by which a target wireless device can determine whether execution of the application is permitted; and transmitting the application, *the first identification information,* and the set of permissions to the target wireless device.

2. The method of claim 1, wherein the set of criteria comprises a first criterion associated with a generic wireless network and a second criterion associated with a specific wireless network.

3. The method of claim 1, wherein the determining includes testing execution of the application within the wireless device execution environment and comparing at least one test result from the execution test to one or more criteria of the set of criteria.

4. The method of claim 3, wherein the at least one test result includes an indication of whether the application made an improper system call and/or negatively affected operation of a device performing the execution test or a device coupled to the device performing the execution test.

5. The method of claim 1, wherein the set of criteria includes a criterion for verifying that the application is compliant with at least one execution restriction associated with the wireless device execution environment.

6. The method of claim 5, wherein the at least one execution restriction includes the application refraining from accessing a given portion of memory on a device operating in accordance with the wireless device execution environment.

7. The method of claim 1, wherein in the transmitting, at least the application is transmitted using a modification detection technique.

8. The method of claim 7, wherein the modification detection technique uses a digital signature.

9. The method of claim 1, wherein the first identification information identifies a developer of the application.

10. The method of claim 1, further comprising:

determining, at the server, to remove the application from the target wireless device; and transmitting a remove command to the target wireless device to remove the application.

11. The method of claim 10, wherein the removal determination is based upon detection of the application executing improperly on another device.

12. The method of claim 10, wherein the removal determination is based upon detection of a newer version of the application being distributed to the target wireless device.

13. The method of claim 1, wherein the server corresponds to an arrangement of multiple servers, and wherein the receiving, determining and/or assigning occur at different servers from among the multiple servers.

14. The method of claim 1, wherein the transmitting further transmits [one or more of the first identification information and/or] a second identification information that identifies the server to the target wireless device.

[15. The method of claim 14, wherein the transmitting transmits both the first identification information and the second identification information.]

16. The method of claim [14] *1*, wherein the transmitting transmits the first identification information and not [the] *a* second identification information *that identifies the server to the target wireless device*.

[17. The method of claim 1, wherein the transmitting transmits the second identification information and not the first identification information.]

18. A method of processing an application for execution on a wireless device communicating over a wireless network, comprising:

receiving the application, a set of permissions by which the wireless device can determine whether execution of the application is permitted on the wireless device and identification information *that identifies a source from which a server receives the application*;

receiving a request to execute the application on the wireless device;

determining whether to grant the execution request based upon an evaluation of the set of permissions and at least one rule, the at least one rule stored in the wireless device prior to receiving the set of permissions, *the at least one rule requiring that the wireless device verify whether the application passed a server-implemented safety test that is specific to a wireless device execution environment of the wireless device*; and selectively executing the application based on the determination.

19. The method of claim 18, wherein the selectively executing executes the application responsive to the determination indicating that the execution request is to be granted.

20. The method of claim 18, wherein the selectively executing removes or disables the application from the wireless device and does not execute the application responsive to the determination indicating that the execution request is not to be granted.

21. The method of claim 18, wherein the determination indicates that the execution request is not to be granted based upon a detection that the application was modified during reception.

22. The method of claim 18, further comprising:

repeating the determining and selectively executing for at least one subsequent request to execute the application.

23. The method of claim 22, wherein the repeating repeats the determining and selectively executing each time the wireless device is requested to execute the application.

24. The method of claim 18, further comprising:

receiving a remove command from a server; and removing the application from the wireless device in response to the remove command.

25. The method of claim 24, wherein the remove command is received responsive to the application executing improperly on another device.

26. The method of claim 24, wherein the remove command is received responsive to a newer version of the application being received at the wireless device.

27. The method of claim 18, wherein the identification information *further* identifies [a] *the* server from which the wireless device receives the application [and/or a source from which the server receives the application].

[28. The method of claim 27, wherein the identification information identifies both the server and the source.]

29. The method of claim 27, wherein the source corresponds to a developer of the application.

30. A server, comprising:

a memory; and a processor coupled to the memory and configured to:

receive an application and a first identification information that identifies a source of the application;

determine that the application satisfies each criterion in a set of criteria, wherein each criterion is respectively associated with *safeguarding* a wireless device execution environment;

assign, to the application based on the determination, a set of permissions by which a target wireless device can determine whether execution of the application is permitted; and transmit the application*, the first identification information,* and the set of permissions to the target wireless device.

31. A wireless device configured to process an application for execution on and to communicate over a wireless network, comprising:

a wireless interface configured to receive the application, a set of permissions by which the wireless device can determine whether execution of the application is permitted on the wireless device and identification information *that identifies a source from which a server receives the application*;

a computer platform coupled to the wireless interface, the computer platform configured to:

receive a request to execute the application on the wireless device;

determine whether to grant the execution request based upon an evaluation of the set of permissions and at least one rule, the at least one rule stored in the wireless device prior to receiving the set of permissions*, the at least one rule requiring that the wireless device verify whether the application passed a server-implemented safety test that is specific to a wireless device execution environment of the wireless device*; and selectively execute the application based on the determination.

[32. A server, comprising:

means for receiving an application and a first identification information that identifies a source of the application;

means for determining that the application satisfies each criterion in a set of criteria, wherein each criterion is respectively associated with a wireless device execution environment;

means for assigning, to the application based on the determination, a set of permissions by which a target wireless device can determine whether execution of the application is permitted; and means for transmitting the application and the set of permissions to the target wireless device.]

[33. A wireless device configured to process an application for execution on and to communicate over a wireless network, comprising:

means for receiving the application, a set of permissions by which the wireless device can determine whether execution of the application is permitted on the wireless device and identification information;

means for receiving a request to execute the application on the wireless device;

means for determining whether to grant the execution request based upon an evaluation of the set of permissions and at least one rule, the at least one rule stored in the wireless device prior to receiving the set of permissions; and means for selectively executing the application based on the determination.]

34. A non-transitory computer-readable medium containing instructions stored thereon, which, when executed by a server, cause the server to perform operations, the instructions comprising:

at least one instruction to receive an application and a first identification information that identifies a source of the application;

at least one instruction to determine that the application satisfies each criterion in a set of criteria, wherein each criterion is respectively associated with *safeguarding* a wireless device execution environment;

at least one instruction to assign, to the application based on the determination, a set of permissions by which a target wireless device can determine whether execution of the application is permitted; and at least one instruction to transmit the application*, the first identification information,* and the set of permissions to the target wireless device.

35. A non-transitory computer-readable medium containing instructions stored thereon, which, when executed by a wireless device configured to process an application for execution on and to communicate over a wireless network, cause the wireless device to perform operations, the instructions comprising:

at least one instruction to receive the application, a set of permissions by which the wireless device can determine whether execution of the application is permitted on the wireless device and identification information *that identifies a source from which a server receives the application*;

at least one instruction to receive a request to execute the application on the wireless device;

at least one instruction to determine whether to grant the execution request based upon an evaluation of the set of permissions and at least one rule, the at least one rule stored in the wireless device prior to receiving the set of permissions*, the at least one rule requiring that the wireless device verify whether the application passed a server-implemented safety test that is specific to a wireless device execution environment of the wireless device*; and at least one instruction to selectively execute the application based on the determination.

*36. A method of operating a server, comprising:*

*receiving an application and a first identification information that identifies a source of the application;*

*determining that the application satisfies each criterion in a set of criteria, wherein each criterion is respectively associated with safeguarding a wireless device execution environment;*

*receiving a set of permissions by which a target wireless device can determine whether execution of the application is permitted; and*

*transmitting the application, the first identification information, and the set of permissions to the target wireless device.*

*37. The method of claim 36, wherein the receiving the set of permissions receives the set of permissions from a different server in communication with the source of the application.*

*38. The method of claim 36, wherein the set of criteria comprises a first criterion associated with a generic wireless network and a second criterion associated with a specific wireless network.*

*39. The method of claim 36, wherein the determining includes testing execution of the application within the wireless device execution environment and comparing at least one test result from the execution test to one or more criteria of the set of criteria.*

*40. The method of claim 39, wherein the at least one test result includes indication of whether the application made an improper system call and/or negatively affected operation of a device performing the execution test or a device coupled to the device performing the execution test.*

*41. The method of claim 36, wherein the set of criteria includes a criterion for verifying that the application is compliant with at least one execution restriction associated with the wireless device execution environment.*

*42. The method of claim 41, wherein the at least one execution restriction includes the application refraining from accessing a given portion of memory on a device operating in accordance with the wireless device execution environment.*

*43. The method of claim 36, wherein in the transmitting, at least the application is transmitted using a modification detection technique.*

*44. The method of claim 43, wherein the modification detection technique uses a digital signature.*

*45. The method of claim 36, wherein the first identification information identifies a developer of the application.*

*46. The method of claim 36, further comprising:*

*determining, at the server, to remove the application from the target wireless device; and*

*transmitting a remove command to the target wireless device to remove the application.*

*47. The method of claim 46, wherein the removal determination is based upon detection of the application executing improperly on another device.*

*48. The method of claim 46, wherein the removal determination is based upon detection of a newer version of the application being distributed to the target wireless device.*

*49. The method of claim 36, wherein the transmitting further transmits a second identification information that identifies the server to the target wireless device.*

*50. The method of claim 36, wherein the transmitting transmits the first identification information and not a second identification information that identifies the server to the target wireless device.*

*51. A server, comprising:*

*a memory; and*

*a processor coupled to the memory and configured to:*

*receive an application and a first identification information that identifies a source of the application;*

*determine that the application satisfies each criterion in a set of criteria, wherein each criterion is respectively associated with safeguarding a wireless device execution environment;*

*receive a set of permissions by which a target wireless device can determine whether execution of the application is permitted; and*

*transmit the application, the first identification information, and the set of permissions to the target wireless device.*

*52. The server of claim 51, wherein the processor is further configured to receive the set of permissions from a different server in communication with the source of the application.*

*53. A non-transitory computer-readable medium containing instructions stored thereon, which, when executed by a server, cause the server to perform operations, the instructions comprising:*

*at least one instruction to receive an application and a first identification information that identifies a source of the application;*

*at least one instruction to determine that the application satisfies each criterion in a set of criteria, wherein each criterion is respectively associated with safeguarding a wireless device execution environment;*

*at least one instruction to receive a set of permissions by which a target wireless device can determine whether execution of the application is permitted; and*

*at least one instruction to transmit the application, the first identification information, and the set of permissions to the target wireless device.*

* * * * *